(12) United States Patent
Cheng

(10) Patent No.: US 10,053,334 B1
(45) Date of Patent: Aug. 21, 2018

(54) OVERSPEED BRAKING MECHANISM FOR A STAIRLIFT

(71) Applicant: MERITS HEALTH PRODUCTS CO., LTD., Taichung (TW)

(72) Inventor: Ming-Chuan Cheng, Taichung (TW)

(73) Assignee: Merits Health Products Co., Ltd., Taichung (TW)

( * ) Notice: Subject to any disclaimer, the term of this patent is extended or adjusted under 35 U.S.C. 154(b) by 0 days.

(21) Appl. No.: 15/469,035

(22) Filed: Mar. 24, 2017

(51) Int. Cl.
    *B66B 9/08* (2006.01)
    *F16D 63/00* (2006.01)

(52) U.S. Cl.
    CPC .............. *B66B 9/08* (2013.01); *F16D 63/006* (2013.01); *B66B 2009/0876* (2013.01)

(58) Field of Classification Search
    CPC .. B66B 9/08; B66B 2009/0876; F16D 63/006
    USPC ........... 188/69, 180; 187/201, 202, 373, 287
    See application file for complete search history.

(56) References Cited

U.S. PATENT DOCUMENTS

| | | | | |
|---|---|---|---|---|
| 4,856,623 A * | 8/1989 | Romig, Jr. | ................. | B66B 5/18 188/180 |
| 6,659,230 B1 * | 12/2003 | Jenkins | ................... | B66B 5/044 187/202 |
| 6,679,353 B1 * | 1/2004 | Muranaka | ................. | B66B 9/08 187/201 |
| 9,031,806 B2 * | 5/2015 | Nunley | ................... | B66B 5/048 702/113 |
| 2005/0279580 A1 * | 12/2005 | Szentistvany | ......... | B66B 9/0815 187/201 |
| 2010/0274409 A1 * | 10/2010 | Smith | ................... | B66B 9/0838 700/304 |
| 2012/0048652 A1 * | 3/2012 | DiGiovanni | .......... | B66B 9/0815 187/201 |
| 2012/0073908 A1 * | 3/2012 | Rosenthal | ................. | B66B 9/08 187/201 |
| 2017/0144860 A1 * | 5/2017 | Colenutt | ................. | B66B 5/044 |
| 2017/0158464 A1 * | 6/2017 | De Kroon | ............. | B66B 9/0838 |

FOREIGN PATENT DOCUMENTS

GB                2264283 A * 8/1993 ............. B66B 5/044

* cited by examiner

*Primary Examiner* — Thomas J Williams
*Assistant Examiner* — Mariano Sy
(74) *Attorney, Agent, or Firm* — Muncy, Geissler, Olds & Lowe, P.C.

(57) ABSTRACT

An overspeed braking mechanism for a stairlift includes: a main shaft driven by a motor to rotate; a claw member connecting with the main shaft to thereby rotate synchronously with the main shaft and having a tooth; a cam member connecting with the claw member and having an abutting portion spaced apart from the tooth of the claw member radially by a predetermined angle; a driven unit having a cam contact portion, wherein the abutting portion of the cam member abuts against the cam contact portion to cause the driven unit to swing, whereas a pawl portion of a claw contact member engages with the tooth of the claw member and has a switch contact portion; and a micro switch adapted to be touched by the switch contact portion, controlling the motor to drive the main shaft to rotate.

10 Claims, 7 Drawing Sheets

OVERSPEED BRAKING MECHANISM FOR A STAIRLIFT

BACKGROUND OF THE INVENTION

1. Field of the Invention

The present invention relates to stairlifts and, more particularly, to an overspeed braking mechanism for a stairlift.

2. Description of the Prior Art

Conventional overspeed braking mechanisms for a stairlift fall into two categories: those with simple structures and thus predisposed to imprecise operation may be wrongly judged operational or may operate unnecessarily; and those with complicated structures and thus capable of precise operation take up too much space while in operation. As a result, conventional overspeed braking mechanisms for a stairlift still have room for improvement.

SUMMARY OF THE INVENTION

In view of the aforesaid drawbacks of the prior art, it is an objective of the present invention to provide an overspeed braking mechanism for a stairlift, and the overspeed braking mechanism not only has a simple structure but also operates precisely and quickly.

In order to achieve the above and other objectives, the present invention provides an overspeed braking mechanism for a stairlift, mounted on a base, the overspeed braking mechanism comprising: a main shaft driven by a motor to rotate; a claw member connecting with the main shaft to thereby rotate synchronously with the main shaft and having a tooth; a cam member connecting with the claw member and having an abutting portion spaced apart from the tooth of the claw member radially by a predetermined angle; a driven unit having a cam contact portion, wherein the abutting portion of the cam member abuts against the cam contact portion to cause the driven unit to swing, whereas a pawl portion of a claw contact member engages with the tooth of the claw member and has a switch contact portion; a restoring element causing the driven unit to swing, thereby allowing the cam contact portion to tilt closer toward the cam member; and a micro switch adapted to be touched by the switch contact portion, thereby controlling the motor to drive the main shaft to rotate.

Preferably, the driven unit comprises a cam contact member connected to the claw contact member.

Preferably, the switch contact portion is defined at the claw contact member.

Preferably, the driven unit has a roller pivotally connected to the cam contact member, and the roller externally, circumferentially defines the cam contact portion.

Preferably, the restoring element is connected between a restoring connected portion of the driven unit and the base.

Preferably, the cam contact member and the claw contact member are coupled together and fixed in place with a penetrating pipe, whereas two bushings are inserted oppositely into an internal hole of the penetrating pipe, respectively, and fitted around a pivot.

DETAILED DESCRIPTION OF THE EMBODIMENT OF THE INVENTION

Figure 1:
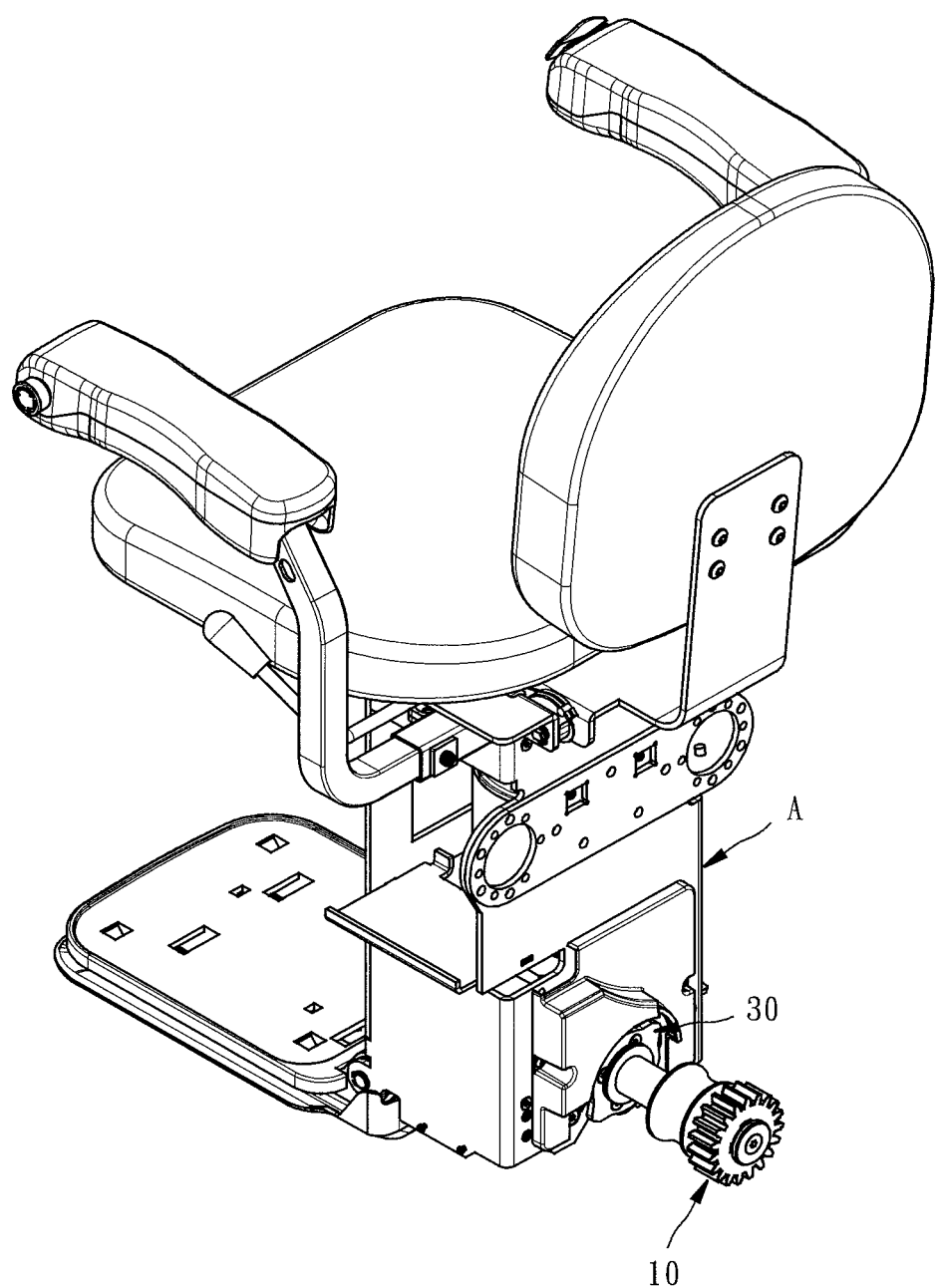
FIG. 1 is a perspective view of an overspeed braking mechanism for a stairlift according to an embodiment of the present invention.

The present invention is further explained by the accompanying diagrams and an embodiment.

As shown in the diagrams, an overspeed braking mechanism for a stairlift, as provided by the present invention, is mounted on a base A. The overspeed braking mechanism for a stairlift comprises a main shaft 10, a claw member 20, a cam member 30, a driven unit 4, a restoring element 70, and a micro switch 80.

The main shaft 10 is driven by a motor to rotate.

The claw member 20 connects with the main shaft 10 and thus rotates synchronously with the main shaft 10. The claw member 20 has a tooth 22.

The cam member 30 connects with the claw member 20. The cam member 30 has an abutting portion 32. The abutting portion 32 is spaced apart from the tooth 22 of the claw member 20 radially by a predetermined angle, preferably 90 degrees substantially in a preferred embodiment of the present invention and thus requires four abutting portions 32 and four teeth 22.

In a preferred embodiment of the present invention, the claw member 20 and the cam member 30 are coupled together and fixed in place with four bolts B.

The driven unit 4 comprises a cam contact member 40. A claw contact member 50 is connected to the cam contact member 40.

The cam contact member 40 has a swinging arm 41 and a restoring connected portion 42. A roller 45 is pivotally connected to the swinging arm 41. The roller 45 externally, circumferentially defines a cam contact portion 46. The abutting portions 32 of the cam member 30 abut against the cam contact portion 46 to enable the driven unit 4 to swing.

The claw contact member 50 has a pawl portion 51 for engaging with one of the teeth 22 of the claw member 20 and a switch contact portion 52 located at the other end of the swing center.

The cam contact member 40 and the claw contact member 50 are coupled together and fixed in place with a penetrating pipe 61 (by welding in this embodiment, but the present invention is not limited thereto, for example, the cam contact member 40 and the claw contact member 50 are formed integrally or fixed together by whatever means of fixing). Afterward, two bushings 62 (provided in the form of self-lubricating or oil impregnated sleeves or bearings, but the present invention is not limited thereto) are inserted oppositely into an internal hole of the penetrating pipe 61, respectively. The two bushings 62 fit around a pivot 63. The pivot 63 is then fixed to the base A.

The restoring element 70 is connected between the restoring connected portion 42 of the driven unit 4 and the base A.

The restoring element 70 causes the driven unit 4 to swing, allowing the cam contact portion 46 to tilt closer toward the cam member 30.

The micro switch 80 is adapted to be touched by the switch contact portion 52, thereby controlling the motor to drive the main shaft 10 to rotate.

Figure 2:
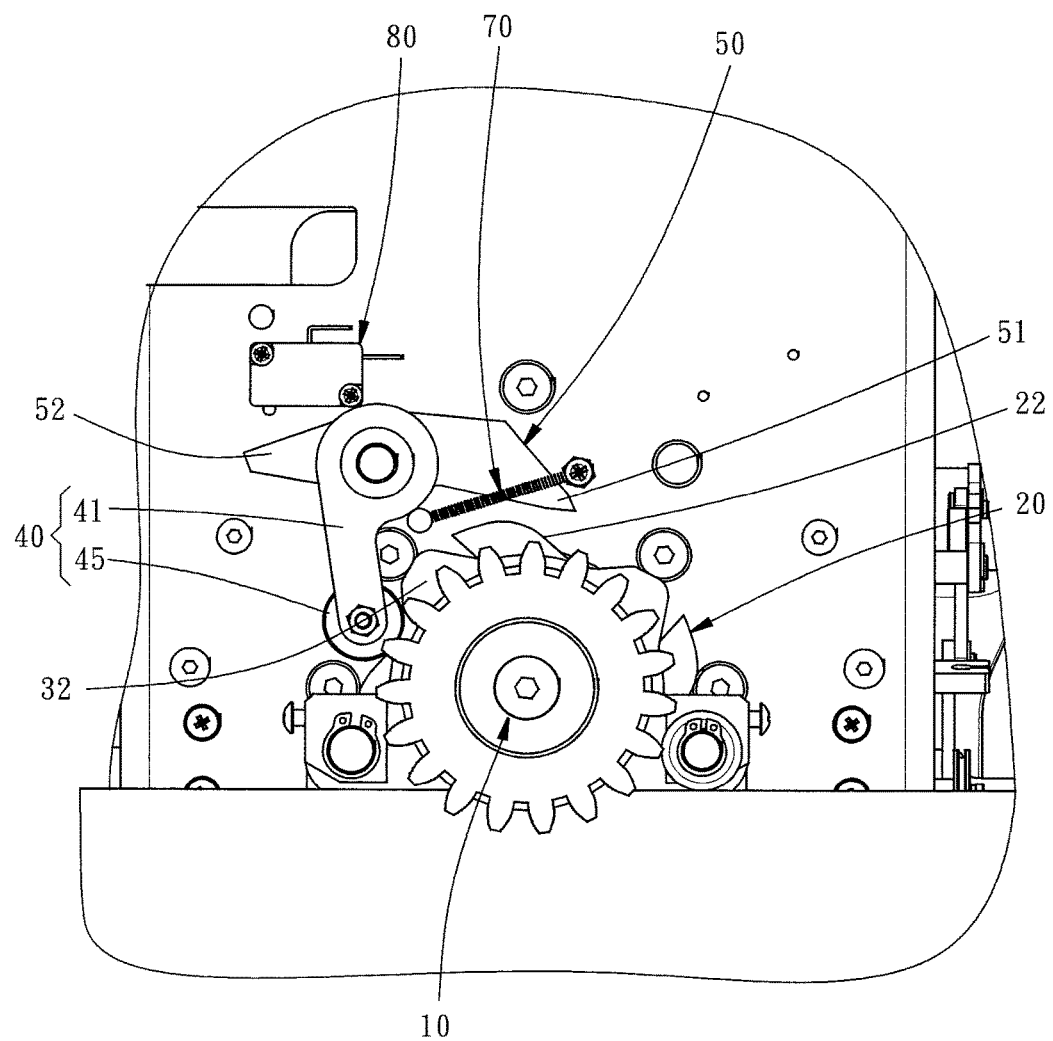
FIG. 2 is a schematic view of operation of the overspeed braking mechanism according to an embodiment of the present invention.
Figure 3:
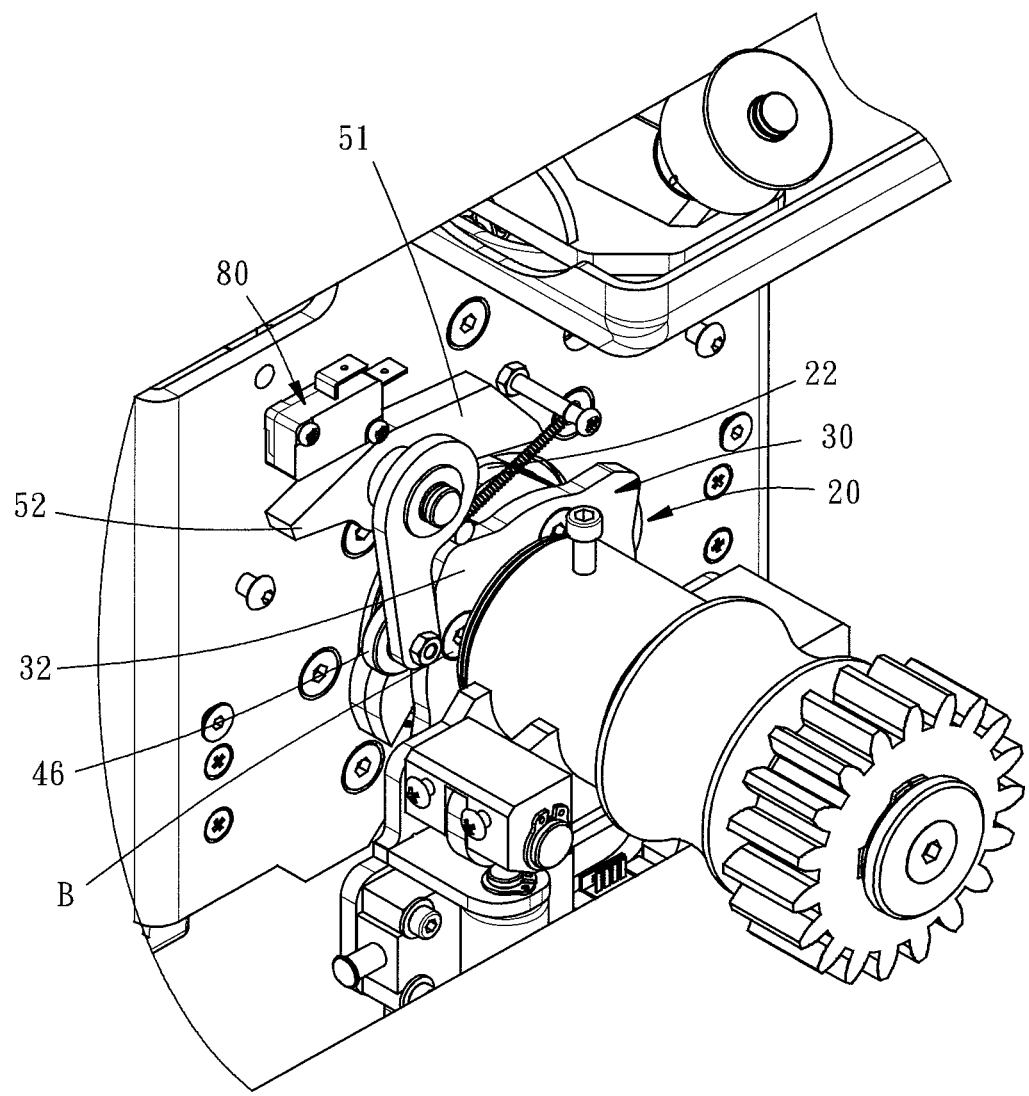
FIG. 3 is a perspective view with reference to FIG. 2.
Figure 4:
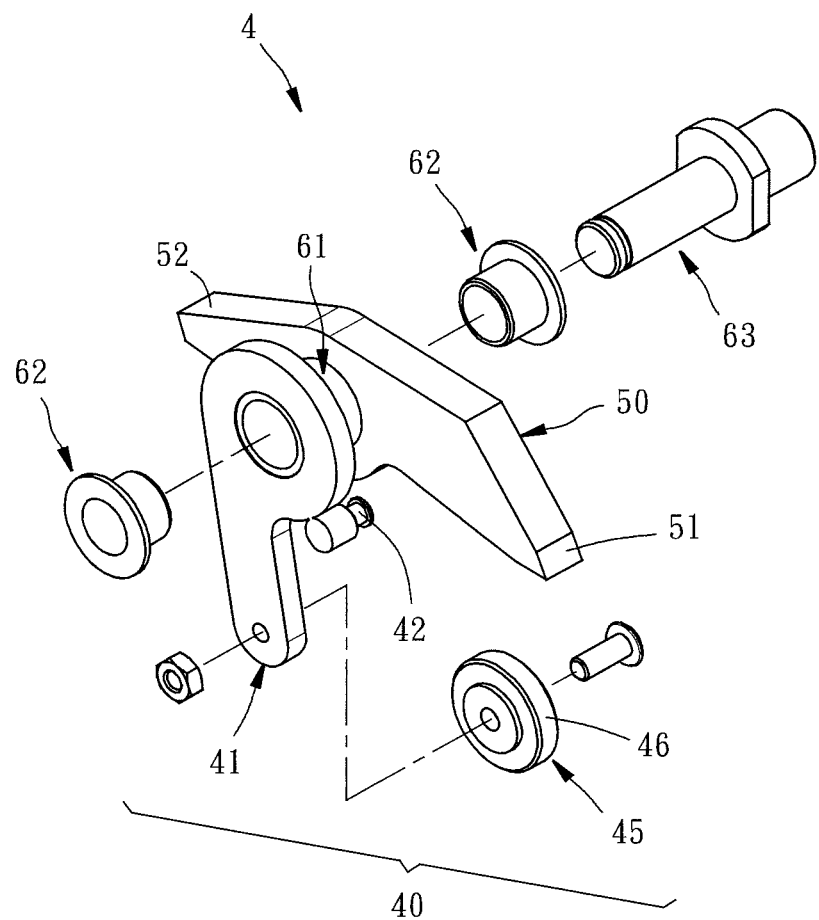
FIG. 4 is a partial exploded view of the overspeed braking mechanism according to an embodiment of the present invention.
Figure 5:
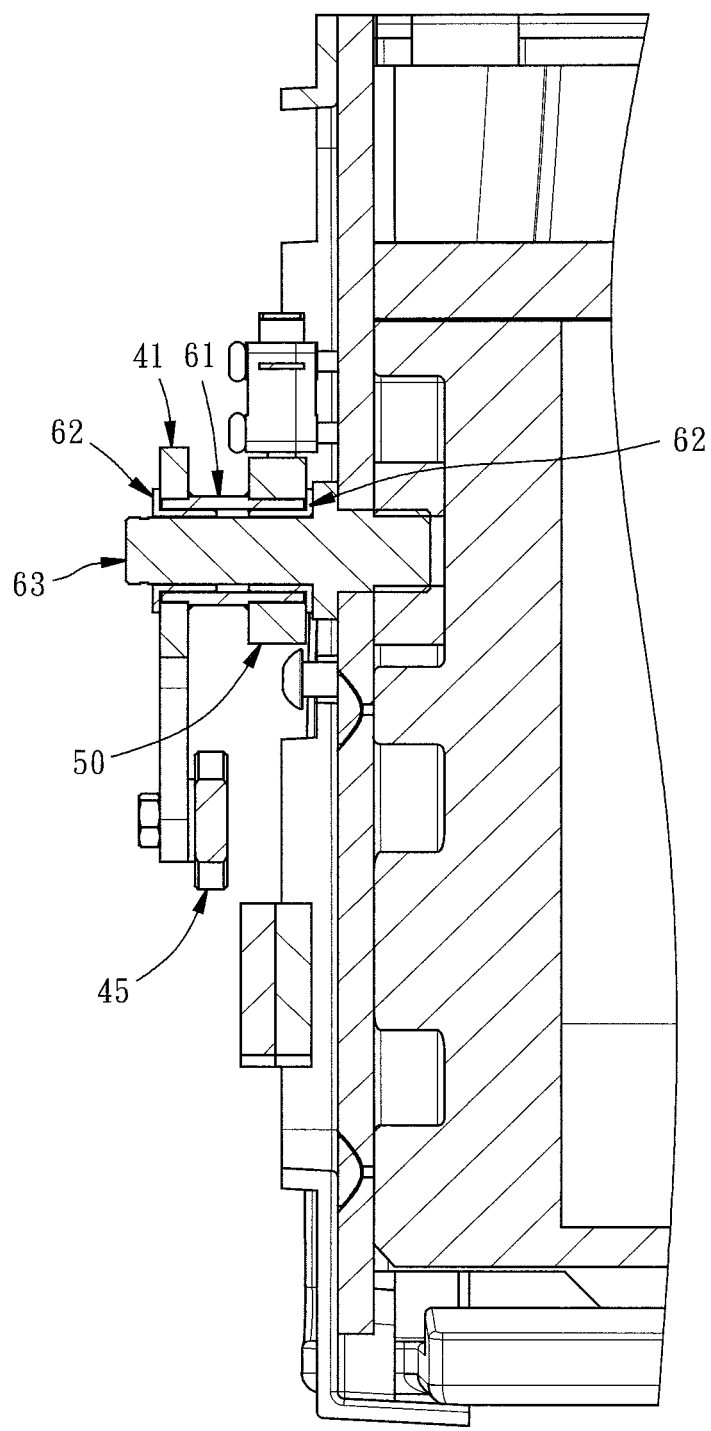
FIG. 5 is a partial cross-sectional view of the overspeed braking mechanism according to an embodiment of the present invention.

Referring to FIG. 2 and FIG. 3, since the cam member 30 has not yet rotated to the extent to enable the abutting portions 32 to touch the cam contact portion 46 of the driven unit 4, the driven unit 4 has not swung, nor is the claw contact member 50 engaged with one of the teeth 22.

The abutting portions 32 of the cam member 30 just come into contact with the cam contact portion 46 of the driven unit 4 as soon as the cam member 30 rotates by a predetermined angle; meanwhile, although the driven unit 4 has swung, the claw contact member 50 is not engaged with one of the teeth 22 because of dislocation design.

By the time when the cam member 30 has rotated to the extent to enable the abutting portions 32 of the cam member 30 to separate from the cam contact portion 46 of the driven unit 4, it is the rotation speed that determines whether the claw contact member 50 will be engaged with one of the teeth 22.

If the main shaft 10 rotates at a normal rotation speed, the claw contact member 50 is restored to its initial position before the arrival of the tooth 22 and thus is not engaged with the tooth 22, whereas the main shaft 10 rotates normally.

Figure 6:
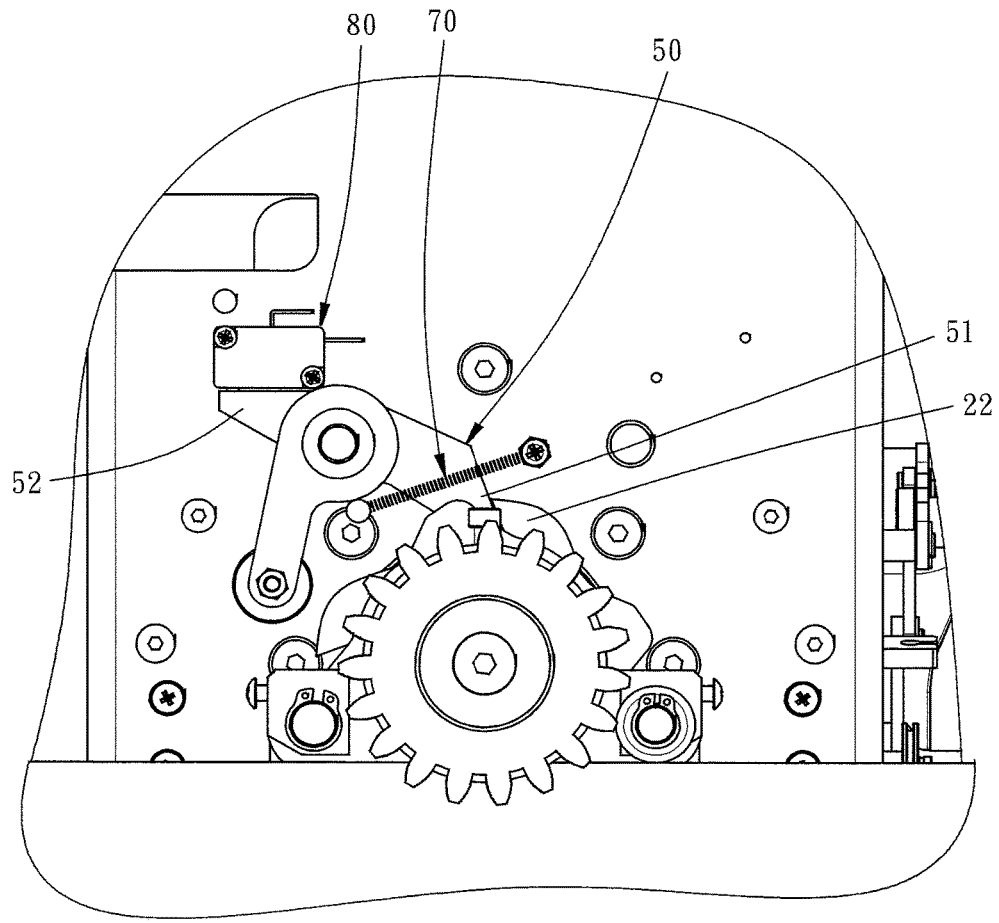
FIG. 6 is another schematic view of operation of the overspeed braking mechanism according to an embodiment of the present invention.
Figure 7:
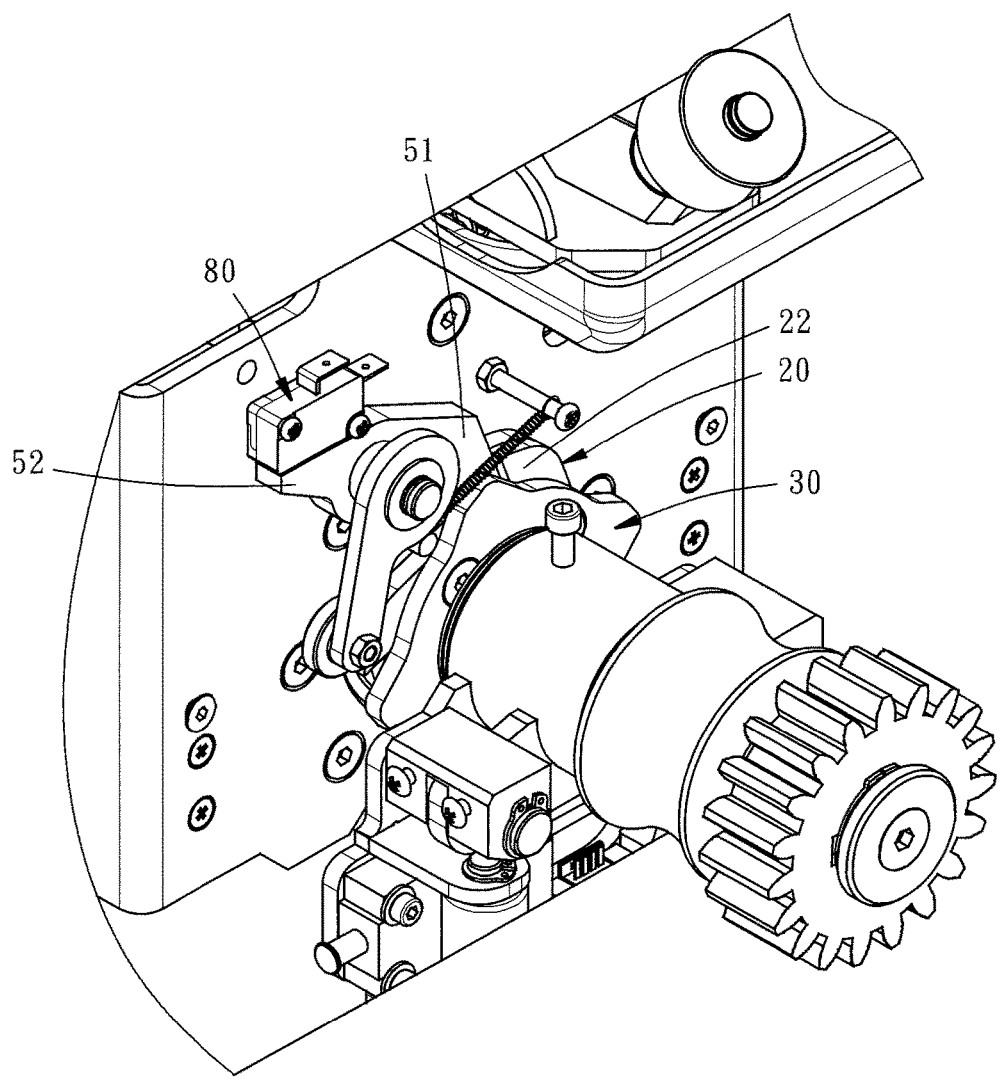
FIG. 7 is a perspective view with reference to FIG. 6.

If the main shaft 10 rotates at an overly high rotation speed, the abutting portions 32 of the cam member 30 push the cam contact portion 46 continuously and quickly so that the claw contact member 50 has not yet been restored to its initial position and thus can be engaged with the tooth 22; at this point in time, the switch contact portion 52 abuts against the micro switch 80 and thus controls the main shaft 10 to rotate slower or stop rotating, thereby enhancing user safety, as shown in FIG. 6 and FIG. 7.

In addition to the aforesaid embodiment, the present invention is illustrated by a variant embodiment described below.

For instance, the restoring element 70 is not limited to the aforesaid extension spring, but can also be a compression spring, a torsion spring, or the like.

In conclusion, the overspeed braking mechanism for a stairlift according to the present invention not only has a simple structure but also operates precisely and quickly, thereby achieving the objectives of the present invention.

The preferred embodiments of the present invention are described above in length. Understandably, persons skilled in the art can make plenty changes and variations to the concepts embodied in the present invention without making any creative effort. Hence, all technical solutions put forth by persons skilled in the art in accordance with the concepts embodied in the present invention, as well as the prior art, and by logical analyses, inferences, or finite experiments shall be deemed falling within the scope of the appended claims.

What is claimed is:

1. An overspeed braking mechanism for a stairlift, mounted on a base, the overspeed braking mechanism comprising:
    a main shaft driven by a motor to rotate;
    a claw member connecting with the main shaft to thereby rotate synchronously with the main shaft and having a tooth;
    a cam member connecting with the claw member and having an abutting portion spaced apart from the tooth of the claw member radially by a predetermined angle;
    a driven unit having a cam contact portion, wherein the abutting portion of the cam member abuts against the cam contact portion to cause the driven unit to swing, whereas a pawl portion of a claw contact member engages with the tooth of the claw member and has a switch contact portion;
    a restoring element causing the driven unit to swing, thereby allowing the cam contact portion to tilt closer toward the cam member; and
    a micro switch adapted to be touched by the switch contact portion, thereby controlling the motor to drive the main shaft to rotate.

2. The overspeed braking mechanism for a stairlift in accordance with claim 1, wherein the driven unit comprises a cam contact member connected to the claw contact member.

3. The overspeed braking mechanism for a stairlift in accordance with claim 2, wherein the switch contact portion is defined at the claw contact member.

4. The overspeed braking mechanism for a stairlift in accordance with claim 2, wherein the driven unit has a roller pivotally connected to the cam contact member, and the roller externally, circumferentially defines the cam contact portion.

5. The overspeed braking mechanism for a stairlift in accordance with claim 4, wherein the restoring element is connected between a restoring connected portion of the driven unit and the base.

6. The overspeed braking mechanism for a stairlift in accordance with claim 5, wherein the cam contact member and the claw contact member are coupled together and fixed in place with a penetrating pipe, whereas two bushings are inserted oppositely into an internal hole of the penetrating pipe, respectively, and fitted around a pivot.

7. The overspeed braking mechanism for a stairlift in accordance with claim 4, wherein the cam contact member and the claw contact member are coupled together and fixed in place with a penetrating pipe, whereas two bushings are inserted oppositely into an internal hole of the penetrating pipe, respectively, and fitted around a pivot.

8. The overspeed braking mechanism for a stairlift in accordance with claim 2, wherein the cam contact member and the claw contact member are coupled together and fixed in place with a penetrating pipe, whereas two bushings are inserted oppositely into an internal hole of the penetrating pipe, respectively, and fitted around a pivot.

9. The overspeed braking mechanism for a stairlift in accordance with claim 1, wherein the restoring element is connected between a restoring connected portion of the driven unit and the base.

10. The overspeed braking mechanism for a stairlift in accordance with claim 9, wherein the driven unit comprises a cam contact member connected to the claw contact member, wherein the cam contact member and the claw contact member are coupled together and fixed in place with a penetrating pipe, whereas two bushings are inserted oppositely into an internal hole of the penetrating pipe, respectively, and fitted around a pivot.

* * * * *